United States Patent
Xiong et al.

(10) Patent No.: US 12,095,301 B2
(45) Date of Patent: *Sep. 17, 2024

(54) PULSE CHARGING METHOD, BATTERY MANAGEMENT SYSTEM OF TRACTION BATTERY AND CHARGING PILE

(71) Applicant: CONTEMPORARY AMPEREX TECHNOLOGY CO., LIMITED, Ningde (CN)

(72) Inventors: Shuyun Xiong, Ningde (CN); Yu Yan, Ningde (CN); Zhimin Dan, Ningde (CN); Zhanliang Li, Ningde (CN); Weiping Sun, Ningde (CN)

(73) Assignee: CONTEMPORARY AMPEREX TECHNOLOGY CO., LIMITED, Fujian (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/980,860

(22) Filed: Nov. 4, 2022

(65) Prior Publication Data

US 2023/0076134 A1 Mar. 9, 2023

Related U.S. Application Data

(63) Continuation of application No. PCT/CN2021/074181, filed on Jan. 28, 2021.

(51) Int. Cl.
*B60L 53/62* (2019.01)
*B60L 58/12* (2019.01)
(Continued)

(52) U.S. Cl.
CPC .......... *H02J 7/00711* (2020.01); *B60L 53/62* (2019.02); *B60L 58/12* (2019.02); *H01M 10/425* (2013.01);
(Continued)

(58) Field of Classification Search
CPC .. H02J 7/00711; H02J 7/00036; H02J 7/0047; H02J 7/00712; H02J 7/007194;
(Continued)

(56) References Cited

U.S. PATENT DOCUMENTS

| 4,389,608 | A | * | 6/1983 | Dahl | ......................... H02J 7/02 320/137 |
| 5,525,892 | A | * | 6/1996 | Phommarath | ........ H02J 7/00711 320/155 |

(Continued)

FOREIGN PATENT DOCUMENTS

| CN | 102468656 A | 5/2012 | |
| CN | 105680541 A | * | 6/2016 | .............. B60L 58/12 |

(Continued)

OTHER PUBLICATIONS

International Search Report dated Oct. 11, 2021 issued in PCT/CN2021/074181.

(Continued)

*Primary Examiner* — John T Trischler
(74) *Attorney, Agent, or Firm* — Scully, Scott, Murphy & Presser, P.C.

(57) ABSTRACT

A charging method, a battery management system for a traction battery and a charging pile are provided, which can effectively ensure normal charging of an electric vehicle. The charging method is used for charging a traction battery, and the method includes: determining, by the battery management system (BMS) of the traction battery, a pulse charging demand parameter according to a battery state parameter of the traction battery; and sending a pulse charging information to a charging pile by the BMS, the pulse charging information including the pulse charging demand parameter for indicating the charging pile to output a pulse current for charging the traction battery.

16 Claims, 3 Drawing Sheets

(51) Int. Cl.
*H01M 10/42* (2006.01)
*H01M 10/44* (2006.01)
*H01M 10/46* (2006.01)
*H02J 7/00* (2006.01)
*B60L 53/66* (2019.01)

(52) U.S. Cl.
CPC ......... *H01M 10/443* (2013.01); *H01M 10/46* (2013.01); *H02J 7/00036* (2020.01); *H02J 7/0047* (2013.01); *H02J 7/00712* (2020.01); *H02J 7/007194* (2020.01); *B60L 53/66* (2019.02); *H01M 2010/4271* (2013.01); *H01M 2220/20* (2013.01)

(58) Field of Classification Search
CPC .. H01M 10/425; H01M 10/443; H01M 10/46; B60L 53/62; B60L 58/12
USPC .................................................. 320/139, 109
See application file for complete search history.

(56) References Cited

U.S. PATENT DOCUMENTS

| | | | | |
|---|---|---|---|---|
| 5,548,200 | A * | 8/1996 | Nor | B60L 53/11 320/132 |
| 5,633,574 | A * | 5/1997 | Sage | H01M 10/44 320/152 |
| 5,726,551 | A * | 3/1998 | Miyazaki | B60L 53/12 320/155 |
| 5,773,955 | A * | 6/1998 | Hall | H02J 7/00711 320/108 |
| 5,994,872 | A * | 11/1999 | Hall | H02J 7/02 320/108 |
| 6,137,265 | A * | 10/2000 | Cummings | H02J 7/00711 320/133 |
| 6,441,588 | B1 * | 8/2002 | Yagi | B60L 58/27 320/150 |
| 8,334,675 | B2 * | 12/2012 | Wang | H02J 7/007192 320/129 |
| 8,378,626 | B2 * | 2/2013 | Wang | H02J 7/00 320/140 |
| 8,381,829 | B2 * | 2/2013 | Hanawa | H01M 50/583 173/217 |
| 8,493,024 | B2 * | 7/2013 | Kissel, Jr. | B60M 1/10 320/109 |
| 8,579,042 | B2 * | 11/2013 | Hanawa | H01M 10/482 173/217 |
| 8,698,458 | B2 * | 4/2014 | Kim | H02J 7/00711 320/164 |
| 8,907,631 | B1 * | 12/2014 | Gurries | G01K 13/00 320/141 |
| 9,331,364 | B2 * | 5/2016 | Ramaswamy | H01M 10/052 |
| 9,409,487 | B2 * | 8/2016 | Shao | B60L 53/665 |
| 9,469,202 | B2 * | 10/2016 | Miglioranza | B60L 50/64 |
| 9,496,735 | B2 * | 11/2016 | Sarkar | B60L 58/16 |
| 9,751,419 | B2 * | 9/2017 | Kwon | B60L 53/36 |
| 9,866,056 | B2 * | 1/2018 | Ramaswamy | H01M 10/425 |
| 9,912,181 | B2 * | 3/2018 | Gurries | H02J 7/007192 |
| 9,969,288 | B2 * | 5/2018 | Ikeda | B60L 53/14 |
| 9,991,726 | B2 * | 6/2018 | Small, Jr. | H02J 7/0071 |
| 10,166,882 | B2 * | 1/2019 | Yang | B60L 53/00 |
| 10,186,887 | B2 * | 1/2019 | Wang | B60L 58/12 |
| 10,193,366 | B2 * | 1/2019 | Josephs | H02J 7/0013 |
| 10,195,950 | B2 * | 2/2019 | Dow | B60L 53/305 |
| 10,256,512 | B2 * | 4/2019 | Sun | H02J 7/007194 |
| 10,279,700 | B2 * | 5/2019 | Takebayashi | B60L 58/13 |
| 10,886,757 | B2 * | 1/2021 | Zuo | H01M 10/63 |
| 10,933,767 | B2 * | 3/2021 | Javaid | G06Q 20/02 |
| 11,075,524 | B2 * | 7/2021 | Small, Jr. | H02J 7/00 |
| 11,177,676 | B2 * | 11/2021 | Liu | B60L 53/14 |
| 11,299,057 | B2 * | 4/2022 | Lemke | B60L 3/0046 |
| 11,355,793 | B2 * | 6/2022 | Yamamoto | H01M 10/46 |
| 11,390,178 | B1 * | 7/2022 | Wiegman | B60L 53/65 |
| 11,397,215 | B2 * | 7/2022 | Ghantous | H02J 7/0047 |
| 11,397,216 | B2 * | 7/2022 | Ghantous | H02J 7/007182 |
| 11,398,744 | B2 * | 7/2022 | Sun | H02J 7/007192 |
| 11,440,429 | B2 * | 9/2022 | Lim | B60L 50/61 |
| 11,485,517 | B1 * | 11/2022 | Wiegman | H02J 7/00034 |
| 11,515,588 | B2 * | 11/2022 | Du | H01M 10/633 |
| 11,575,273 | B2 * | 2/2023 | Rauner | B60L 53/62 |
| 2002/0070710 | A1 | 6/2002 | Yagi et al. | |
| 2008/0042621 | A1 * | 2/2008 | Miglioranza | B60L 1/08 320/150 |
| 2009/0071675 | A1 * | 3/2009 | Hanawa | H02J 7/0031 173/217 |
| 2010/0225269 | A1 * | 9/2010 | Liu | H01M 10/052 320/134 |
| 2010/0320965 | A1 * | 12/2010 | Kissel, Jr. | B60L 53/32 320/109 |
| 2011/0106336 | A1 * | 5/2011 | Eikeland | B60L 53/11 348/148 |
| 2011/0273139 | A1 * | 11/2011 | Hofheinz | B60L 53/65 320/109 |
| 2012/0007547 | A1 * | 1/2012 | Kim | H02J 7/0069 320/150 |
| 2012/0025773 | A1 * | 2/2012 | Wang | H02J 7/00714 320/129 |
| 2012/0112696 | A1 * | 5/2012 | Ikeda | H01M 10/48 320/109 |
| 2012/0112703 | A1 | 5/2012 | Xu et al. | |
| 2012/0319643 | A1 * | 12/2012 | Wang | H02J 7/00 320/107 |
| 2013/0154549 | A1 * | 6/2013 | Hanawa | H01M 50/574 429/7 |
| 2013/0229153 | A1 * | 9/2013 | Sarkar | B60L 3/04 320/137 |
| 2014/0035530 | A1 * | 2/2014 | Shao | H02J 7/00304 320/109 |
| 2014/0266068 | A1 * | 9/2014 | O'Brien | B60L 3/003 320/139 |
| 2015/0137741 | A1 * | 5/2015 | Gurries | H02J 7/007192 320/150 |
| 2015/0221990 | A1 * | 8/2015 | Ramaswamy | H02J 7/00 204/229.4 |
| 2016/0023563 | A1 * | 1/2016 | Wang | B60L 58/24 320/152 |
| 2016/0031333 | A1 * | 2/2016 | Dow | B60L 53/38 307/10.1 |
| 2016/0089989 | A1 * | 3/2016 | Park | B60L 53/62 320/108 |
| 2016/0107534 | A1 * | 4/2016 | Ikeda | H01M 10/44 307/9.1 |
| 2016/0129799 | A1 * | 5/2016 | Kwon | B60L 53/38 320/108 |
| 2016/0152151 | A1 * | 6/2016 | Yang | B60L 53/22 320/109 |
| 2016/0185234 | A1 * | 6/2016 | Miglioranza | B60L 50/64 320/150 |
| 2016/0204624 | A1 * | 7/2016 | Small, Jr. | H02J 7/00 320/139 |
| 2016/0204625 | A1 * | 7/2016 | Josephs | H02J 7/0048 320/139 |
| 2016/0218522 | A1 * | 7/2016 | Ramaswamy | H01M 10/052 |
| 2017/0136888 | A1 * | 5/2017 | Ricci | B60M 7/003 |
| 2017/0136889 | A1 * | 5/2017 | Ricci | B60L 53/126 |
| 2018/0134173 | A1 * | 5/2018 | Takebayashi | G01R 31/36 |
| 2018/0257492 | A1 * | 9/2018 | O'Hara | H01M 10/0525 |
| 2018/0287404 | A1 * | 10/2018 | Small, Jr. | H02J 7/0047 |
| 2018/0339597 | A1 * | 11/2018 | Kruszelnicki | B60L 53/305 |
| 2018/0339601 | A1 * | 11/2018 | Kruszelnicki | B60L 53/16 |
| 2019/0027792 | A1 * | 1/2019 | Sun | H01M 10/633 |
| 2019/0072618 | A1 * | 3/2019 | Ghantous | H02J 7/005 |
| 2019/0120910 | A1 * | 4/2019 | Ghantous | H02J 7/0047 |
| 2019/0363550 | A1 * | 11/2019 | Zuo | H01M 10/657 |
| 2020/0139845 | A1 * | 5/2020 | Henrichs | H04L 12/40 |
| 2020/0215929 | A1 * | 7/2020 | Javaid | B60L 53/126 |
| 2020/0381784 | A1 * | 12/2020 | Yamamoto | H01M 4/525 |
| 2020/0381788 | A1 * | 12/2020 | Du | H01M 10/633 |
| 2020/0406766 | A1 * | 12/2020 | Liu | H02J 7/00711 |
| 2021/0001743 | A1 * | 1/2021 | Rauner | B60L 53/305 |

(56) References Cited

U.S. PATENT DOCUMENTS

| | | | |
|---|---|---|---|
| 2021/0075069 A1* | 3/2021 | Zuo | H01M 10/657 |
| 2021/0188111 A1* | 6/2021 | Lemke | B60L 58/12 |
| 2021/0218263 A1* | 7/2021 | Sun | H01M 10/443 |
| 2021/0384746 A1* | 12/2021 | Zeiler | B60L 58/16 |
| 2022/0001764 A1* | 1/2022 | Lim | H01M 10/48 |
| 2022/0085430 A1* | 3/2022 | Speidel | H01M 50/204 |
| 2022/0173606 A1 | 6/2022 | Mihara | |
| 2022/0236333 A1* | 7/2022 | Liu | H01M 10/48 |
| 2022/0239120 A1* | 7/2022 | Sun | H02J 7/00036 |
| 2022/0239121 A1* | 7/2022 | Li | B60L 58/27 |
| 2022/0239127 A1* | 7/2022 | Sun | B60L 58/12 |
| 2022/0239135 A1* | 7/2022 | Li | H02M 1/36 |
| 2022/0239140 A1* | 7/2022 | Li | B60L 53/11 |
| 2022/0255336 A1* | 8/2022 | Li | H02J 7/007182 |
| 2022/0314742 A1* | 10/2022 | Miyakoshi | B60L 58/12 |
| 2022/0317198 A1* | 10/2022 | Ghantous | H02J 7/0047 |
| 2022/0407322 A1* | 12/2022 | Svedlund | H02J 7/0047 |
| 2022/0407338 A1* | 12/2022 | Li | H02J 7/007192 |
| 2023/0046587 A1* | 2/2023 | Zou | H02J 7/0016 |
| 2023/0053872 A1* | 2/2023 | Wiegman | B60L 53/16 |
| 2023/0064624 A1* | 3/2023 | Huang | B60L 53/30 |
| 2023/0070522 A1* | 3/2023 | Xiong | H01M 10/615 |

FOREIGN PATENT DOCUMENTS

| | | | | |
|---|---|---|---|---|
| CN | 105703022 A | | 6/2016 | |
| DE | 102018121530 A1 | | 3/2020 | |
| IN | 101154821 A | | 4/2008 | |
| IN | 104347896 A | | 2/2015 | |
| JP | H10210675 A | | 8/1998 | |
| JP | 2002125326 A | | 4/2002 | |
| JP | 2010272470 A | | 12/2010 | |
| JP | 2019021608 A | | 2/2019 | |
| JP | 2019117685 A | | 7/2019 | |
| WO | WO-2012055294 A1 | * | 5/2012 | .......... B60L 11/1838 |
| WO | 2020/196648 A1 | | 10/2020 | |
| WO | 2022160186 A1 | | 8/2022 | |

OTHER PUBLICATIONS

Written Opinion dated Oct. 11, 2021 issued in PCT/CN2021/074181.

Extended European Search Report dated Jul. 11, 2022 issued in EP 21815873.1.

Notice of Reasons for Refusal dated May 8, 2023 received in Japanese Patent Application No. JP 2021-575017.

Decision to Grant a Patent dated Oct. 30, 2023 received in Japanese Patent Application No. JP 2021-575017.

* cited by examiner

PULSE CHARGING METHOD, BATTERY MANAGEMENT SYSTEM OF TRACTION BATTERY AND CHARGING PILE

CROSS-REFERENCE TO RELATED APPLICATIONS

This application is a continuation of International Application No. PCT/CN2021/074181, filed on Jan. 28, 2021, the disclosure of which is hereby incorporated by reference in its entirety.

TECHNICAL FIELD

The embodiments of the application relate to the technical field of traction batteries, and more particularly relate to a charging method, a battery management system of a traction battery, and a charging pile.

BACKGROUND

With the aggravation of energy shortage and environmental pollution in modern society, electric vehicles, as new energy vehicles, have attracted wide attention from all walks of life. However, the charging problem of the electric vehicle has always been the main factor limiting its development.

Therefore, how to ensure the effective charging of electric vehicles is an urgent problem to be solved.

SUMMARY

Embodiments of the present application provide a charging method, a battery management system of a traction battery, and a charging pile, which can effectively ensure a normal charging of an electric vehicle.

In a first aspect, a charging method for charging a traction battery is provided, and the method includes: determining a pulse charging demand parameter according to a battery state parameter of the traction battery; and sending a pulse charging information to a charging pile, the pulse charging information including the pulse charging demand parameter for indicating the charging pile to output a pulse current for charging the traction battery.

With the above technical solution, battery management system (BMS) determines the pulse charging demand parameter according to the battery state parameter of the traction battery, and then the charging pile can output pulse current to the traction battery according to the pulse charging demand parameter sent by BMS, which can avoid the problem that the voltage and current output by the charging pile cannot match the traction battery in some scenarios, thus ensuring normal charging of the traction battery. In addition, the battery state parameter may best reflect the state of the traction battery, and the pulse current converted according to the battery state parameter can effectively ensure the normal power supply of the traction battery.

In some possible embodiments, the pulse charging demand parameter includes at least one of the following parameters: a pulse current demand, a pulse voltage demand, a pulse direction demand, a pulse frequency demand, a pulse interval demand, and a pulse duration demand.

In some possible embodiments, the battery state parameter includes at least one of the following parameters of the traction battery: a battery temperature, a battery voltage, a battery capacity, and a state of charge (SOC) of the battery.

In some possible embodiments, the method further includes: determining to enter a pulse charging mode according to the battery state parameter, where the pulse charging mode is a charging mode using a pulse-type voltage or a pulse-type current.

Since the battery state parameter can be a parameter that can best reflect the state of the traction battery, the above technical solution of determining to enter a pulse charging mode according to the battery state parameter can improve the accuracy rate of entering the pulse charging mode.

In some possible embodiments, the battery state parameter includes: a battery temperature of the traction battery, and the determining to enter a pulse charging mode according to the battery state parameter includes under a condition that the battery temperature is less than or equal to a temperature threshold, determining to enter the pulse charging mode.

In the low-temperature environment, the BMS enters the pulse charging mode to make the charging pile output pulse current, which avoids the problem that the lithium battery cannot be charged in the low-temperature environment. Compared with the traditional way, with the above technical solution, it is not necessary to provide an additional heating device in the battery pack to pre-heat the traction battery, so that the charging time can be greatly shortened, the battery temperature can be rapidly increased, and the charging efficiency of the traction battery can be effectively improved. Furthermore, since the heating device is not disposed in the battery pack, the technical solution can also reduce the weight and cost of the traction battery.

In some possible embodiments, the method further includes: under a condition that the battery temperature is greater than the temperature threshold, sending an exit indicating information to the charging pile, the exit indicating information being used for indicating the charging pile to exit the pulse charging mode.

In a second aspect, a charging method for charging a traction battery is provided, and the method includes: receiving, by a charging pile, a pulse charging information sent by a battery management system (BMS) of the traction battery, the pulse charging information including a pulse charging demand parameter for indicating the charging pile to output a pulse current for charging the traction battery; and outputting by the charging pile, the pulse current to the traction battery according to the pulse charging demand parameter.

In some possible embodiments, the pulse charging demand parameter includes at least one of the following parameters: a pulse current demand, a pulse voltage demand, a pulse direction demand, a pulse frequency demand, a pulse interval demand, and a pulse duration demand.

In some possible embodiments, the pulse charging demand parameter is determined according to a battery state parameter of the traction battery.

In some possible embodiments, the battery state parameter includes at least one of the following parameters of the traction battery: a battery temperature, a battery voltage, a battery capacity, and a state of charge (SOC) of the battery.

In some possible embodiments, the method further includes: receiving, by the charging pile, exit indicating information sent by the BMS when the battery temperature of the traction battery is greater than the temperature threshold value, the exit indicating information being used for indicating the charging pile to exit a pulse charging mode, the pulse charging mode being a charging mode using a pulse-type voltage or a pulse-type current.

In a third aspect, a battery management system of a traction battery is provided, which includes: a processing unit configured to determine a pulse charging demand parameter according to a battery state parameter of the traction battery; and a communication unit configured to send a pulse charging information to a charging pile, the pulse charging information including the pulse charging demand parameter for indicating the charging pile to output a pulse current for charging the traction battery.

In some possible embodiments, the pulse charging demand parameter includes at least one of the following parameters: a pulse current demand, a pulse voltage demand, a pulse direction demand, a pulse frequency demand, a pulse interval demand, and a pulse duration demand.

In some possible embodiments, the battery state parameter includes at least one of the following parameters of the traction battery: a battery temperature, a battery voltage, a battery capacity, and a state of charge (SOC) of the battery.

In some possible embodiments, the processing unit is further configured to: determine to enter a pulse charging mode according to the battery state parameter, the pulse charging mode being a charging mode using a pulse-type voltage or a pulse-type current.

In some possible embodiments, the battery state parameter includes a battery temperature of the traction battery, the processing unit is specifically configured to: under a condition that the battery temperature is less than or equal to a temperature threshold, determine to enter the pulse charging mode.

In some possible embodiments, the communication unit is further configured to: under a condition that the battery temperature is greater than the temperature threshold, send an exit indicating information to the charging pile, the exit indicating information being used for indicating the charging pile to exit the pulse charging mode.

In a fourth aspect, a charging pile for charging a traction battery is provided, which includes: a communication unit configured to receive a pulse charging information sent by a battery management system (BMS) of the traction battery, the pulse charging information including a pulse charging demand parameter for indicating the charging pile to output a pulse current for charging the traction battery; and a processing unit configured to output the pulse current to the traction battery according to the pulse charging demand parameter.

In some possible embodiments, the pulse charging demand parameter includes at least one of the following parameters: a pulse current demand, a pulse voltage demand, a pulse direction demand, a pulse frequency demand, a pulse interval demand, and a pulse duration demand.

In some possible embodiments, the pulse charging demand parameter is determined according to a battery state parameter of the traction battery.

In some possible embodiments, the battery state parameter includes at least one of the following parameters of the traction battery: a battery temperature, a battery voltage, a battery capacity, and a state of charge (SOC) of the battery.

In some possible embodiments, the communication unit is further configured to: receive exit indicating information sent by the BMS when the battery temperature of the traction battery is greater than the temperature threshold value, and the exit indicating information being used for indicating the charging pile to exit a pulse charging mode, the pulse charging mode being a charging mode using a pulse-type voltage or a pulse-type current.

In a fifth aspect, a battery management system for a traction battery including a processor and a memory is provided. The memory is configured to store a computer program, and the processor is configured to call and run the computer program stored in the memory to execute the method in the first aspect or respective implementations thereof.

In a sixth aspect, a charging pile including a processor and a memory is provided. The memory is configured to store a computer program, and the processor is configured to call and run the computer program stored in the memory to execute the method in the first aspect or respective implementations thereof.

In a seventh aspect, a computer-readable storage medium for storing a computer program for executing the method in the first aspect or respective implementations thereof is provided.

In an eighth aspect, a computer-readable storage medium for storing a computer program for executing the method in the second aspect or respective implementations thereof is provided.

BRIEF DESCRIPTION OF DRAWINGS

In order to more clearly explain the technical solution of the embodiments of the present application, the drawings required for use in the embodiments of the present application will be briefly described below, and it will be apparent that the drawings described below are only some embodiments of the present application, and other drawings may be obtained from the drawings without exerting creative effort by those of ordinary skill in the art.

DESCRIPTION OF EMBODIMENTS

Figure 1:
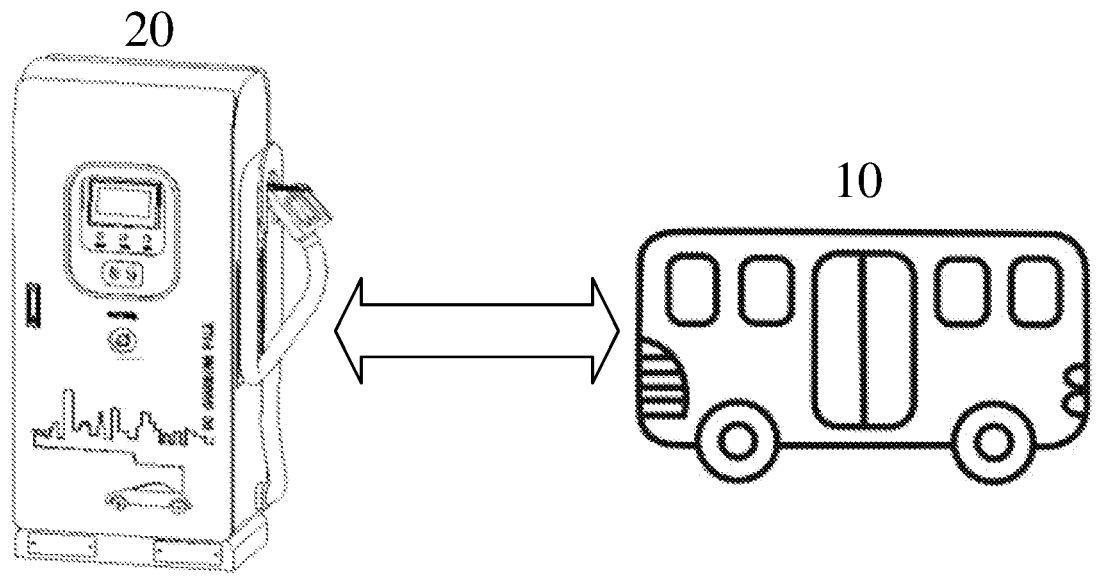
FIG. 1 is a schematic diagram of an application architecture to which a charging method of the embodiments of the present application can be applied.

To make the object, technical solution, and advantages of the embodiments of the present application clearer, the technical solution of the embodiments of the present application will be clearly described in conjunction with the accompanying drawings in the embodiments of the present application, and it will be obvious that the described embodiments are part of the embodiments of the present application, but not all of them. Based on the embodiments in the present application, all other embodiments obtained by those of ordinary skill in the art without exerting creative efforts fall within the scope of protection of the present application.

Unless otherwise defined, all the technical and scientific terms used herein have the same meanings as are commonly understood by those skilled in the art of the present application. Terms used herein in the description of the present application are for the purpose of describing specific embodiments only and are not intended to limit the present application. The terms "including" and "having" and any variations thereof in the description and claims as well as the drawings of the present application are intended to cover a non-exclusive inclusion. The terms "first", "second", etc. in the description and claims or the above drawings of the present application or the above drawings are used to distinguish different objects and are not used to describe a particular order or primary-secondary relationship.

The "embodiment" mentioned in the present application means that special features, structures, or characteristics described in conjunction with the embodiments may be included in at least one embodiment of the present application. The occurrence of "embodiment" in various positions in the description does not necessarily refer to the same embodiment, nor is it a separate or alternative embodiment that is mutually exclusive to other embodiments. It is explicitly and implicitly understood by those skilled in the art that the embodiments described herein may be combined with other embodiments.

In the description of the present application, it should also be noted that unless otherwise expressly specified and limited, the terms "mount", "joint", "connect" and "attach" should be understood in a broad sense, for example, it can be a fixed connection or a detachable connection, or being integrally connected; it can be being directly connected or indirectly connected through an intermediate medium, and it can be an internal communication between two components. The specific meanings of the above terms in the present application may be understood in particular to those of ordinary skill in the art.

The term "and/or" in this application is simply a description of the association relationship of the associated objects, indicating that three relationships can exist, for example, A and/or B, which can mean: A exists alone, both A and B exist, and B exists alone. In addition, the character "/" in the present application generally indicates an alternative relationship between the front and back associated objects.

As used in the present application, "multiple" refers to more than two and includes two, similarly, "multiple sets" refers to more than two sets and includes two sets, and "multichip" refers to more than two chips and includes two chips.

The charging problem of electric vehicles has always been the main factor limiting their development. In some special scenarios, the range of voltage and current that the charging pile can output cannot match that of traction batteries. For example, in the low-temperature scene, the minimum voltage or current that the charging pile can output may also lead to lithium plating during charging, and the traction battery cannot be charged normally. In addition, in some cases, power conversion may be needed between the charging pile and the traction battery, such as voltage change, current change, power state change, current, voltage and power timing change, etc.

In view of this, the embodiment of the application provides a charging method, which can effectively ensure a normal charging of an electric vehicle.

FIG. 1 is a schematic diagram of an application architecture to which a charging method of the embodiments of the present application can be applied, in which the solid line indicates a power line and the dotted line indicates the communication line. The application architecture includes a BMS 10 and a charging pile 20, and the BMS 10 can be connected with the charging pile 20 through the communication line to exchange information with the charging pile 20. For example, the communication line may be a controller area network (CAN) communication line or a daisy-chain communication line.

The BMS 10 is a BMS of a traction battery, and the traction battery is a battery that provides a power source to a power consumption device. Optionally, the traction battery may be a traction storage battery. In terms of the type of battery, the traction battery may be a lithium-ion battery, a lithium-metal battery, a lead-acid battery, a nickel-cadmium battery, a nickel-hydrogen battery, a lithium-sulfur battery, a lithium-air battery, a sodium-ion battery, and the like, which are not specifically limited in the embodiment of the present application. In terms of battery scale, the traction battery in the embodiment of the present application may be a cell/battery cell, may also be a battery module or a battery pack, which is not specifically limited in the embodiment of the present application. Optionally, the power consumption device may be a vehicle, a ship, a spacecraft, or the like, and the embodiment of the present application is not limited thereto. BMS is a control system to protect the safe use of traction batteries, which implements the functions of charge and discharge management, high voltage control, battery protection, battery data collection, battery status evaluation, and so on. The BMS can be integrated with the traction battery and disposed in the same equipment/device, or the BMS can be disposed outside the traction battery as an independent equipment/device.

The charging pile 20, also known as a charger, is a device for charging the traction battery. The charging pile can output charging power according to the charging demand of BMS 10 to charge the traction battery. For example, the charging pile 20 may output voltage and current in accordance with the required voltage and required current sent by the BMS 10.

Figure 2:
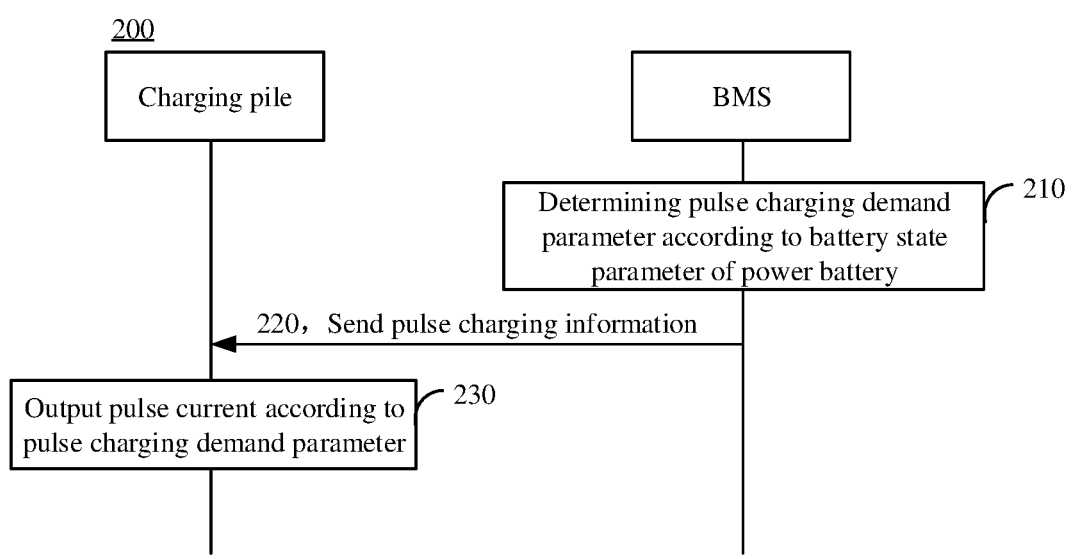
FIG. 2 is a schematic flow chart of a charging method of the embodiment of the present application.

FIG. 2 is a schematic flow chart of a charging method 200 of one embodiment of the present application. It should be understood that the steps or operations in FIG. 2 are only examples and that embodiments of the present application may also execute other operations or variations of the various operations of FIG. 2. Further, the steps in FIG. 2 may be executed in a different order than those presented in FIG. 2, and it is possible that not all of the operations in FIG. 2 are to be executed.

The BMS in the method 200 may be, for example, the BMS 10 in FIG. 1, and the charging pile may be, for example, the charging pile 20 in FIG. 1. The method 200 will be described below with an electric vehicle as an example, but it should be understood that the application is not limited thereto. The method 200 may include some or all of the following steps.

In step 210, the BMS determines a pulse charging demand parameter based on a battery state parameter of the traction battery.

The battery state parameter may include, but is not limited to, at least one of the following parameters of the traction battery: a battery temperature, a battery voltage, a battery capacity, and a state of charge (SOC) of the battery. The pulse charging demand parameter may include at least one of the following parameters: a pulse current demand, a pulse voltage demand, a pulse direction demand, a pulse frequency demand, a pulse interval demand, and a pulse duration demand. For example, the pulse charging demand parameter may include a pulse voltage peak demand value, a pulse current effective value demand value, a pulse current peak demand value, a pulse direction demand, and a pulse frequency demand value.

In one implementation, the BMS can determine the pulse charging demand parameter according to the battery state parameter of the traction battery and according to the corresponding relationship between the battery state parameter and the pulse charging demand parameter.

Optionally, the corresponding relationship between the battery state parameter and the pulse charging demand parameter may be preconfigured on the BMS. For example, the corresponding relationship between the battery state parameter and the pulse charging demand parameter can be preconfigured on the BMS in the form of a table, so that the BMS can determine the pulse charging demand parameter by looking up the table internally. For example, the corresponding relationship between the battery state parameter and the pulse charging demand parameter can be shown in Table 1, in which the first row is the SOC, the first column is the battery temperature, and A, B, and C are the pulse current demand values. BMS can determine the pulse current demand value according to SOC, battery temperature, and Table 1. If the battery temperature is −10° C. and SOC is 30%, BMS can determine the pulse current demand value as B.

TABLE 1

|         | 0% | 10% | 20% | 30% | 40% | 50% | 60% | ... | 100% |
|---------|----|-----|-----|-----|-----|-----|-----|-----|------|
| −20° C. | A  | A   | A   | A   | A   | A   |     |     |      |
| −10° C. | A  | A   | B   | B   | C   | C   |     |     |      |
| 0° C.   | B  | B   | B   | B   |     |     |     |     |      |
| 10° C.  | B  | B   | B   | B   |     |     |     |     |      |
| 20° C.  | C  | C   | C   | C   |     |     |     |     |      |
| 30° C.  | C  | C   | C   | C   |     |     |     |     |      |
| ...     |    |     |     |     |     |     |     |     |      |

It should be understood that Table 1 is an example only, the SOC is not necessarily 0-100%, and the gradient values of battery temperature and SOC are not necessarily as shown in Table 1. It should also be understood that the corresponding relationship between the battery state parameter and the pulse charging demand parameter may be a linear relationship or a nonlinear relationship.

Optionally, the corresponding relationship between the battery state parameter and the pulse charging demand parameter may also be obtained by the BMS from other devices.

In another implementation, BMS can first determine a direct current charging demand parameter according to the battery state parameter, and then determine the pulse charging demand parameter according to the direct current charging demand parameter.

Specifically, the direct current charging demand parameter may include at least one of the following parameters: a voltage demand value, a current demand value, and an output mode of the charging pile. The output mode of the charging pile is a constant current mode or a constant voltage mode. In the constant voltage mode, the output voltage of the charging pile should satisfy the voltage demand value, and the output current should not exceed the current demand value. In the constant current mode, the output current of the charging pile should satisfy the current demand value, and the output voltage should not exceed the voltage demand value. BMS can carry out an internal calculation based on the direct current charging demand parameter, to obtain the pulse charging demand parameter. Alternatively, the BMS may determine the pulse charging demand parameter based on the determined direct current charging demand parameter and the corresponding relationship between the direct current charging demand parameter and the pulse charging demand parameter.

Before step 210, the BMS may enter the pulse charging mode first, and then judge whether the state of the traction battery satisfies the condition of pulse charging according to the battery state parameter. If the battery state parameter satisfies the condition of pulse charging, the BMS then executes step 210. If the battery state parameters do not satisfy the condition of pulse charging, the BMS switches from a pulse charging mode to a direct current charging mode.

Where, the pulse charging mode is a charging mode using a pulse-type voltage or a pulse-type current, and the direct current charging mode is a charging mode using a constant voltage or a constant current.

For example, when the battery state parameter includes the battery temperature, if the battery temperature is less than or equal to a temperature threshold (exemplary, the temperature threshold is 5° C.), the BMS determines that the state of the traction battery satisfies the condition of pulse charging, and executes step 210. Alternatively, when the battery state parameter includes the SOC, if the SOC is less than or equal to the SOC threshold, the BMS determines that the state of the traction battery satisfies the condition of pulse charging, and executes step 210. Alternatively, when the battery state parameter includes the battery temperature and SOC, if the battery temperature is less than or equal to the temperature threshold and the SOC is less than or equal to the SOC threshold, the BMS determines that the state of the traction battery satisfies the condition of pulse charging, and executes step 210.

To solve the problem of charging electric vehicles in a low-temperature environment, most of the traction batteries of electric vehicles in the market are equipped with a thermal management system. When the temperature of the traction battery is too low, the thermal management system can convert a part of electric energy into heat energy, thus heating the whole battery group. This preheating method can make the traction battery at a more suitable temperature, based on this, the charging pile then charges the traction battery. However, this preheating method is to charge the traction battery after the temperature of the traction battery is increased. The space for increasing the temperature of the traction battery is limited, which makes it impossible to fundamentally solve the problem that the charging time of electric vehicles is too long in a low-temperature environment. In addition, the configuration of the thermal management system in the traction battery will not only increase the weight of the traction battery, but also increase the cost of the traction battery.

With the above technical solution, the BMS enters the pulse charging mode to make the charging pile output pulse current, so that the normal charging of the traction battery can be realized. Compared with the traditional way, it is not necessary in the embodiment of the present application to provide an additional heating device in the battery pack to pre-heat the traction battery, so that the charging time can be greatly shortened, the battery temperature can be rapidly increased, and the charging efficiency of the traction battery can be effectively improved. Furthermore, since the heating device is not disposed in the battery pack, the technical solution can also reduce the weight and cost of the traction battery.

On the contrary, when the battery state parameter includes the battery temperature, if the battery temperature is greater than the temperature threshold, the BMS determines that the state of the traction battery does not satisfy the condition of pulse charging, and then the BMS switches from the pulse charging mode to the direct current charging mode.

In another possible implementation, BMS can enter direct current charging mode first, and then judge whether the state of traction battery satisfies the condition of pulse charging according to the battery state parameter. If the battery state parameter satisfies the condition of pulse charging, the BMS switches from the direct current charging mode to the pulse charging mode. If the battery state parameter does not satisfy the condition of pulse charging, the BMS continues to maintain the direct current charging mode.

In another possible embodiment, after obtaining the battery state parameter, the BMS may determine whether to enter the pulse charging mode or the direct current charging mode according to the battery state parameter.

In step 220, the BMS sends a pulse charging information to the charging pile.

The pulse charging information includes a pulse charging demand parameter, the pulse charging demand parameter is used to indicate that the charging pile outputs the pulse current, and the pulse current is used for charging the traction battery. That is, the pulse charging demand parameter is used to indicate the pulse charging mode.

Illustratively, the BMS may send a first message to the charging pile, the contents of which may be as shown in Table 2.

TABLE 2

| Serial number | Content | Length | Remark |
|---|---|---|---|
| 1 | Pulse voltage peak demand value (V) | 2 bytes | |
| 2 | Pulse current effective value demand value (A) | 2 bytes | Unit: A<br>Resolution: 0.1 A/bit<br>Range: −2000 A to 2000 A<br>Offset: −2000 A |
| 3 | Pulse current peak demand value | 2 bytes | Unit: A<br>Resolution: 0.1 A/bit<br>Range: −2000 A to 2000 A<br>Offset: 2000 A |
| 4 | Pulse direction demand | 1 byte | 1: Positive; 2: Negative;<br>3: Bidirectional (positive and negative);<br>Other invalid |
| 5 | Pulse frequency demand value | 2 bytes | Unit: Hz<br>Resolution: 1 Hz/bit<br>Range: 0 to 10000 Hz<br>Offset: 0 |

It should be noted that the pulse current of the embodiment of the present application can also be referred to as a pulse current waveform or a pulse charging waveform.

If the charging pile does not receive the charging information sent by BMS within a predetermined time, the charging pile can end the charging process. Illustratively, the predetermined time may be 1 second.

Alternatively, the charging pile can consider that the state of the traction battery reaches the condition of direct current charging, and switch from the pulse charging mode to the direct current charging mode. For example, the charging pile can be directly switched to the direct current charging mode. For another example, the charging pile can send inquiry information to BMS, the inquiry information is used for inquiring whether the state of the traction battery satisfies the condition of direct current charging. If the charging pile receives the determination information sent by the BMS, the charging pile can output direct current to the BMS. If the charging pile receives negative response information (such as negative acknowledgement information) sent by the BMS, the charging pile can immediately end charging.

To better match the current charging protocol, BMS can also send a direct current charging demand parameter to the charging pile. As an example, the first message may include the direct current charging demand parameter. As another example, the direct current charging demand parameter may be carried in a battery charging demand (BCL) message, the contents specifically included in the BCL message may be shown in Table 3.

TABLE 3

| Serial number | Content | Length |
|---|---|---|
| 1 | Voltage demand (V) | 2 bytes |
| 2 | Current demand (A) | 2 bytes |
| 3 | Charging Mode<br>(0 × 01: Constant Voltage Mode;<br>0 × 02: Constant Current Mode) | 2 bytes |

Optionally, the BMS may simultaneously send the BCL message and the first message to the charging pile, or the BMS may first send the first message to the charging pile and then send the BCL message, or the BMS may first send the BCL message to the charging pile and then send the first message, which is not specifically limited in the embodiment of the present application.

In step 230, the charging pile outputs the pulse current to the traction battery according to the pulse charging demand parameter, and the pulse current is used to charge the traction battery.

Further, the method 200 may further include: during the pulse charging process, the BMS judges in real time whether the state of the traction battery satisfies the condition of pulse charging. If the current state of the traction battery satisfies the condition of pulse charging, the BMS continues to maintain the pulse charging mode. If the current state of the traction battery does not satisfy the condition of pulse charging, the BMS exits the pulse charging mode.

As an example, the BMS may determine at a preset time period whether the state of the traction battery satisfies the condition of pulse charging. For example, the BMS can judge whether the state of the traction battery satisfies the condition of pulse charging every 1 s.

Optionally, the preset time period may be negotiated between the BMS and the charging pile.

Optionally, the preset time period may be self-determined by the BMS.

As another example, the BMS can determine whether the state of the traction battery satisfies the condition of pulse charging when obtaining the battery state parameter. That is to say, BMS judges whether the state of the traction battery satisfies the condition of pulse charging every time it obtains the battery state parameter.

When the current state of the traction battery satisfies the condition of pulse charging, in order to enable the charging pile monitor the charging process in real time, so that the charging pile can output the best pulse current suitable for charging the traction battery, the BMS can also report pulse charging measurement parameter to the charging pile in real time, the pulse charging measurement parameter can include but not limited to at least one of the following state values: a pulse charging voltage measurement value, a pulse charging current measurement value, a pulse direction, and a pulse frequency measurement value. Optionally, the BMS may send a second message to the charging pile, the second message includes the pulse charging measurement parameter. For example, the contents of the second message may be as shown in Table 4.

TABLE 4

| Serial number | Content | Length | Send options |
|---|---|---|---|
| 1 | Pulse charging voltage measurement value | 2 bytes | |
| 2 | Pulse charging current peak measurement value | 2 bytes | Unit: A<br>Resolution: 0.1 A/bit<br>Range: −2000 A to 2000 A<br>Offset: 2000 A |
| 3 | Pulse charging current effective value measurement value | 2 bytes | Unit: A<br>Resolution: 0.1 A/bit<br>Range: −2000 A to 2000 A<br>Offset: 2000 A |
| 4 | Pulse direction | 1 byte | 1: Positive; 2: Negative;<br>3: Bidirectional (positive and negative);<br>Other invalid |
| 5 | Pulse frequency measurement value | 2 bytes | Unit: Hz<br>Resolution: 1 Hz/bit<br>Range: 0 to 10000 Hz<br>Offset: 0 |

After receiving the second message, the charging pile can adjust the pulse current output to the traction battery in real time based on the pulse charging measurement parameter. In this way, the charging pile can output the pulse current most suitable for the state of the traction battery at the current time, thus further improving the charging efficiency.

If the charging pile does not receive the second message within, for example, 5 seconds, the charging pile may end the pulse charging of the traction battery. For example, the charging pile can immediately end the pulse charging.

In addition to the first message, the BMS may also send a battery charge state (BCS) message to the charging pile, and the BCS message may include at least one of the following parameters: a charging voltage measurement value, a charging current measurement, a maximum single traction battery voltage and its group number, a current SOC, and an estimated remaining charging time. For example, the contents of the BCS message may be as shown in Table 5.

TABLE 5

| Serial number | Content | Length |
|---|---|---|
| 1 | Charging voltage measurement value | 2 bytes |
| 2 | Charging current measurement value | 2 bytes |
| 3 | Maximum single traction battery voltage and its group number | 2 bytes |
| 4 | Current SOC | 1 byte |
| 5 | Estimated remaining charging time | 2 bytes |

Similar to the first message and the BCL message, the BSM can simultaneously send the second message and the BCS message to the charging pile, or the BSM can send the second message first and then send the BCS message, or the BSM can send the BCS message first and then send the second message.

Furthermore, in the pulse charging process, in order to enable the BMS to monitor the pulse current, pulse voltage, and other information output by the charging pile at the current time, the charging pile can send a third message to the BMS, the third message includes a pulse charging voltage output value, a pulse charging current output value, a pulse direction and a pulse frequency output value, etc. For example, the contents of the third message are shown in Table 6.

TABLE 6

| Serial number | Content | Length | Send options |
|---|---|---|---|
| 1 | Pulse charging voltage output value | 2 bytes | |
| 2 | Pulse charging peak current output value | 2 bytes | Unit: A<br>Resolution: 0.1 A/bit<br>Range: −2000 A to 2000 A<br>Offset: 2000 A |
| 3 | Pulse charging effective current output value | 2 bytes | Unit: A<br>Resolution: 0.1 A/bit<br>Range: −2000 A to 2000 A<br>Offset: 2000 A |
| 4 | Pulse direction | 1 byte | 1: Positive; 2: Negative;<br>3: Bidirectional (positive and negative);<br>Other invalid |
| 5 | Pulse frequency output value | 2 bytes | Unit: Hz<br>Resolution: 1 Hz/bit<br>Range: 0 to 10000 Hz<br>Offset: 0 |

Optionally, if the BMS does not receive the third message within a certain period of time, the BMS may end the pulse charging. For example, the BMS can immediately end pulse charging, or the BMS can switch from pulse charging to direct current charging.

Similarly, in order to better correspond to the current charging protocol, the charging pile can also send the direct current charging output parameter to BMS. As an example, the third message may include the direct current charging output parameter. As another example, the direct current charging output parameter may, for example, be carried in a charger charging state (CCS) message, and the CCS message may specifically include contents as shown in Table 7, for example.

TABLE 7

| Serial number | Content | Length |
|---|---|---|
| 1 | Voltage output value | 2 bytes |
| 2 | Current output value | 2 bytes |
| 3 | Accumulated charging time | 2 bytes |
| 4 | Charging permission (00 = paused, 01 = allowed) | 1 byte |

In the embodiments of the present application, the method 200 may further include: if the battery state parameter reaches a parameter threshold, such as a battery temperature is 10° C., the BMS can exit the pulse charging mode. At the same time, the BMS can also send an exit instruction to the charging pile, and the exit instruction is used to indicate the charging pile to exit the pulse charging mode.

Optionally, the exit instruction may include 1 bit, with bit "1" indicating the charging pile to exit the pulse charging mode, and bit "0" indicating the charging pile to maintain the pulse charging mode. Alternatively, the exit instruction may include a plurality of bits, indicating the charging pile to exit the pulse charging mode if the plurality of bits are the same, and indicating the charging pile to maintain the pulse charging mode if at least two of the plurality of bits are different.

Figure 3:
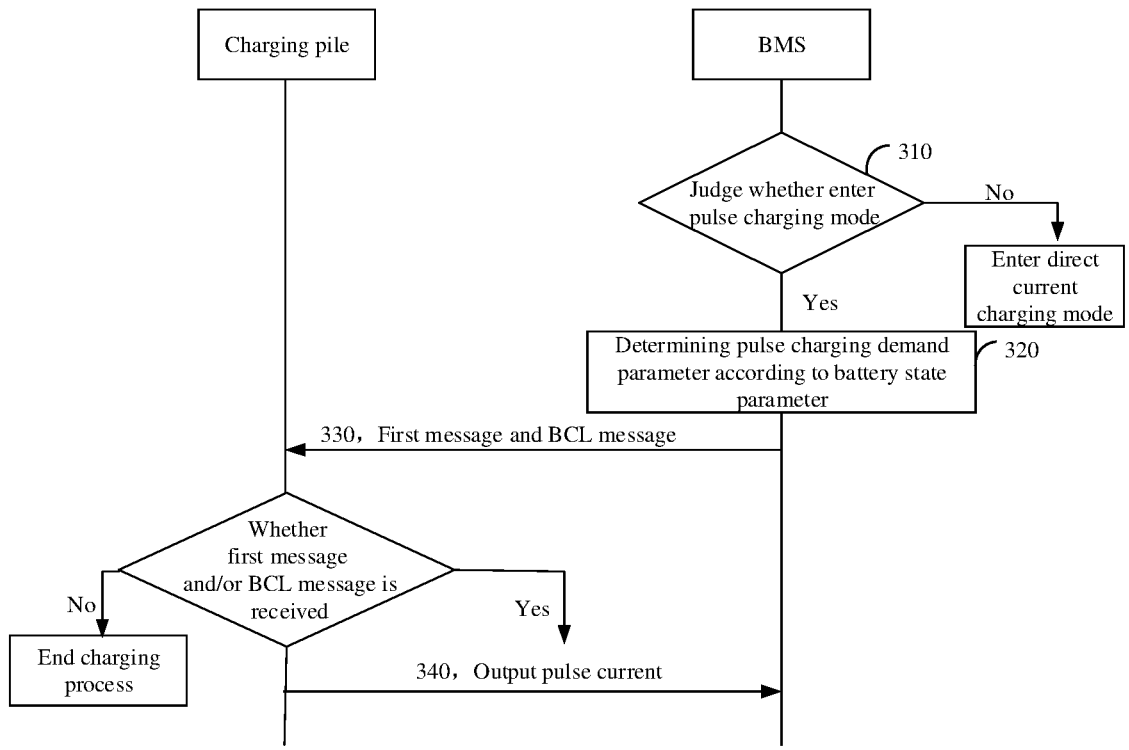
FIG. 3 is a specific schematic flow chart of the charging method shown in FIG. 2.

To more clearly describe embodiments of the present application, a specific implementation process of the method 200 is described in detail below with reference to FIG. 3. It should be understood that FIG. 3 is only intended to assist those skilled in the art in better understanding of the embodiments of the present application, and is not intended to limit the scope of the embodiments of the present application.

In 310, the BMS determines whether to enter the pulse charging mode based on the battery state parameter.

For example, the BMS compares the battery temperature to a temperature threshold, assuming that the temperature threshold is 5° C. If the battery temperature is less than or equal to 5° C., the BMS determines to enter the pulse charging mode, and executes step 320; and if the battery temperature is greater than 5° C., the BMS enters the direct current charging mode.

In 320, the BMS determines a pulse charging demand parameter based on the battery state parameter.

Where the pulse charging demand parameter may include a pulse voltage peak demand value, a pulse current effective value demand value, a pulse current peak demand value, a pulse direction demand, and a pulse frequency demand value.

In 330, the BMS sends the first message and the BCL message to the charging pile.

Where the first message includes a pulse charging demand parameter, and the BCL message includes a voltage demand value, a current demand value and a charging mode.

If the charging pile receives the first message and/or the BCL message within 1 second, the charging pile executes step 340; and if the charging pile does not receive the first message and/or the BCL message within 1 second, the charging pile immediately ends charging.

In 340, the charging pile outputs a pulse current to the traction battery according to the pulse charging demand parameter.

According to the embodiments of the present application, the BMS determines the pulse charging demand parameter according to the battery state parameter of the traction battery, and then the charging pile can output pulse current to the traction battery according to the pulse charging demand parameter sent by BMS, which can avoid the problem that the voltage and current output by the charging pile cannot match the traction battery in some scenarios, thus ensuring normal charging of the traction battery. In addition, the battery state parameter can best reflect the state of the traction battery, and the pulse current converted according to the battery state parameter can effectively ensure the normal power supply of the traction battery.

In the embodiments of the present application, the serial number of the above-mentioned processes does not mean the sequence of execution, and the execution sequence of each process should be determined by its function and internal logic, and should not constitute any limitation on the implementation process of the embodiments of the present application.

Moreover, on the premise of no conflict, each embodiment described in the present application and/or the technical features in each embodiment can be arbitrarily combined with each other, and the technical solution obtained after combination should also fall within the scope of protection of the present application.

The charging method of the embodiment of the present application has been described in detail above, and the BMS of the traction battery of the embodiment of the present application will be described below. It should be understood that the BMS in the embodiment of the present application may execute the charging method in the embodiment of the present application and has a function of executing the corresponding method.

Figure 4:
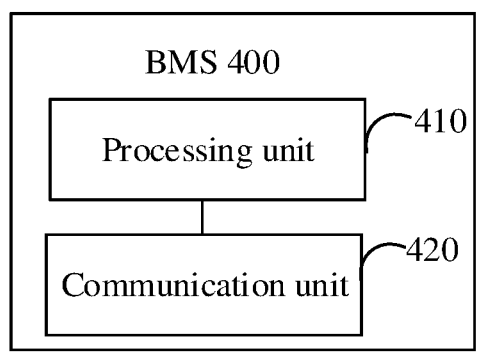
FIG. 4 is a schematic block diagram of a battery management system for a traction battery of the embodiments of the present application.

FIG. 4 shows a schematic block diagram of a BMS 400 of a traction battery of the embodiments of the present application. As shown in FIG. 4, the BMS 400 may include:
- a processing unit 410 configured to determine a pulse charging demand parameter according to a battery state parameter of the traction battery;
- a communication unit 420 configured to send a pulse charging information to a charging pile, the pulse charging information including the pulse charging demand parameter for indicating the charging pile to output a pulse current for charging the traction battery.

Optionally, in the embodiment of the present application, the pulse charging demand parameter includes at least one of the following parameters: a pulse current demand, a pulse voltage demand, a pulse direction demand, a pulse frequency demand, a pulse interval demand and a pulse duration demand.

Optionally, in the embodiments of the present application, the battery state parameter includes at least one of the following parameters of the traction battery: a battery temperature, a battery voltage, a battery capacity, and a state of charge (SOC) of the battery.

Optionally, in the embodiment of the present application, the processing unit 410 is further configured to: determine to enter a pulse charging mode according to the battery state parameter, the pulse charging mode being a charging mode using a pulse-type voltage or a pulse-type current.

Optionally, in the embodiment of the present application, the battery state parameter includes a battery temperature of the traction battery, the processing unit 410 is specifically configured to: under a condition that the battery temperature is less than or equal to a temperature threshold, determine to enter the pulse charging mode.

Optionally, in the embodiment of the present application, the communication unit 420 is further configured to: under a condition that the battery temperature is greater than the temperature threshold, send an exit indicating information to the charging pile, the exit indicating information is used for indicating the charging pile to exit the pulse charging mode.

It should be understood that the BMS 400 may implement the corresponding operations of the BMS in the method 200, which will not be repeated here for the sake of brevity.

Figure 5:
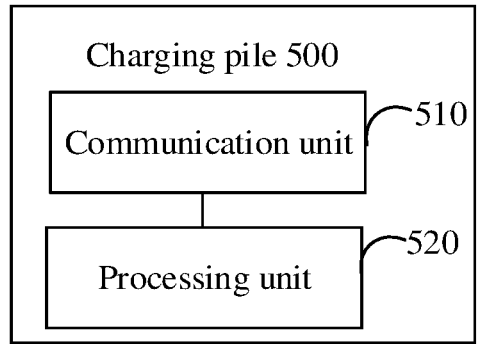
FIG. 5 is a schematic block diagram of a charging pile of the embodiments of the present application.

FIG. 5 shows a schematic block diagram of a charging pile 500 of the embodiments of the present application. The charging pile 500 is used for charging the traction battery, as shown in FIG. 5, and the charging pile 500 includes:
- a communication unit 510 configured to receive a pulse charging information sent by a battery management system (BMS) of the traction battery, the pulse charging information including a pulse charging demand parameter for indicating the charging pile to output a pulse current for charging the traction battery; and
- a processing unit 520 configured to output the pulse current to the traction battery according to the pulse charging demand parameter.

Optionally, in the embodiment of the present application, the pulse charging demand parameter includes at least one of the following parameters: a pulse current demand, a pulse voltage demand, a pulse direction demand, a pulse frequency demand, a pulse interval demand and a pulse duration demand.

Optionally, in the embodiments of the present application, the pulse charging demand parameter is determined according to a battery state parameter of the traction battery.

Optionally, in the embodiments of the present application, the battery state parameter includes at least one of the following parameters of the traction battery: a battery temperature, a battery voltage, a battery capacity, and a state of charge (SOC) of the battery.

Optionally, in the embodiments of the present application, the communication unit 510 is further configured to: receive exit indicating information sent by the BMS when the battery temperature of the traction battery is greater than the temperature threshold value, and the exit indicating information being used for indicating the charging pile to exit a pulse charging mode, the pulse charging mode being a charging mode using a pulse-type voltage or a pulse-type current.

It should be understood that the charging pile 500 may implement the corresponding operations of the charging pile in the method 200, which will not be repeated here for the sake of brevity.

Figure 6:
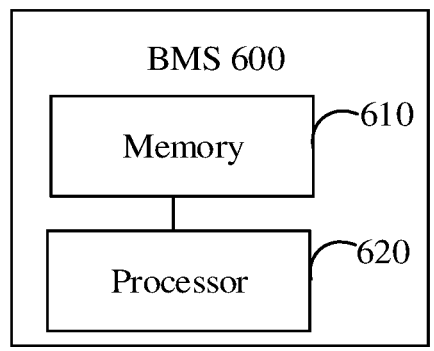
FIG. 6 is a schematic block diagram of the battery management system of the traction battery of another embodiment of the present application.

FIG. 6 shows a schematic block diagram of a BMS 600 of a traction battery of another embodiment of the present application. As shown in FIG. 6, the BMS 600 includes a memory 610 and a processor 620. The memory 610 is coupled to the processor 620, the memory 610 is configured to store a program instruction, and the processor 620 is configured to call the program instruction stored in the memory 610 to execute the methods of various embodiments of the present application described above.

Figure 7:
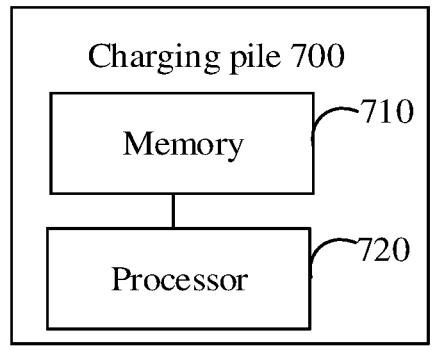
FIG. 7 is a schematic block diagram of the charging pile of another embodiment of the present application.

FIG. 7 shows a schematic block diagram of a charging pile 700 of another embodiment of the present application. As shown in FIG. 7, the charging pile 700 includes a memory 710 and a processor 720. The memory 710 is coupled to the processor 720, the memory 710 is configured to store a program instruction, and the processor 720 is configured to call the program instruction stored in the memory 710 to execute the methods of various embodiments of the present application described above.

The embodiments of the present application also provide a computer-readable storage medium for storing a computer program for executing the aforementioned methods of various embodiments of the present application.

Finally, it should be noted that the above embodiments are only used to illustrate the technical solution of the present application, not to limit it. Although the present application has been described in detail with reference to the foregoing embodiments, it will be understood by those of ordinary skill in the art that modifications may still be made to the technical solution described in the foregoing embodiments, or some technical features thereof may be equivalently replaced, but such modifications or replacements do not depart the essence of the corresponding technical solution from the spirit and scope of the technical solution of the various embodiments of the present application.

What is claimed is:

1. A charging method for charging a traction battery, the method comprising:
   determining a pulse charging demand parameter according to a battery state parameter of the traction battery; and
   sending a pulse charging information to a charging pile, the pulse charging information comprising the pulse charging demand parameter for indicating the charging pile to output a pulse current for charging the traction battery;
   wherein the method further comprises:
   sending a direct current charging demand parameter to the charging pile, the direct current charging demand parameter comprising at least one of the following parameters: a voltage demand, a current demand, and a charging mode, the charging mode comprising a constant voltage mode or a constant current mode;
   sending a battery charge state message to the charging pile, the battery charge state message comprising: an estimated remaining charging time, a charging voltage measurement value, a charging current measurement, a current SOC and a group number with its maximum single traction battery voltage.

2. The method according to claim 1, wherein the pulse charging demand parameter comprises at least one of the following parameters: a pulse current demand, a pulse voltage demand, a pulse direction demand, a pulse frequency demand, a pulse interval demand and a pulse duration demand; and
   the battery state parameter comprises at least one of the following parameters of the traction battery: a battery temperature, a battery voltage, a battery capacity, and a state of charge (SOC) of the battery.

3. The method according to claim 1, wherein the method further comprises:
   receiving a direct current charging output parameter, the direct current charging output parameter comprising at least one of the following parameters: a voltage output value, a current output value, an accumulated charging time and a charging permission.

4. The method according to claim 1, wherein the method further comprises:
   determining to enter a pulse charging mode according to the battery state parameter,
   wherein the pulse charging mode is a charging mode using a pulse-type voltage or a pulse-type current.

5. The method according to claim 4, wherein the battery state parameter comprises a battery temperature of the traction battery, and
   the determining to enter a pulse charging mode according to the battery state parameter comprises:
   under a condition that the battery temperature is less than or equal to a temperature threshold, determining to enter the pulse charging mode.

6. The method according to claim 5, wherein the method further comprises:
   under a condition that the battery temperature is greater than the temperature threshold, sending an exit indicating information to the charging pile, the exit indicating information being used for indicating the charging pile to exit the pulse charging mode.

7. A charging method for charging a traction battery, the method comprising:
   receiving, by a charging pile, a pulse charging information sent by a battery management system (BMS) of the traction battery, the pulse charging information comprising a pulse charging demand parameter for indicating the charging pile to output a pulse current for charging the traction battery; and
   outputting, by the charging pile, the pulse current to the traction battery according to the pulse charging demand parameter;
   wherein the method further comprises:
   receiving, by the charging pile, a direct current charging demand parameter, the direct current charging demand parameter comprising at least one of the following parameters: a voltage demand, a current demand, and a charging mode, the charging mode comprising a constant voltage mode or a constant current mode;
   receiving, by the charging pile, a battery charge state message, the battery charge state message comprising:

an estimated remaining charging time, a charging voltage measurement value, a charging current measurement, a current SOC and a group number with its maximum single traction battery voltage.

8. The method according to claim 7, wherein the pulse charging demand parameter comprises at least one of the following parameters: a pulse current demand, a pulse voltage demand, a pulse direction demand, a pulse frequency demand, a pulse interval demand and a pulse duration demand;
the pulse charging demand parameter is determined according to a battery state parameter of the traction battery;
the battery state parameter comprises at least one of the following parameters of the traction battery: a battery temperature, a battery voltage, a battery capacity, and a state of charge (SOC) of the battery.

9. The method according to claim 7, wherein the method further comprises:
sending a direct current charging output parameter, the direct current charging output parameter comprising at least one of the following parameters: a voltage output value, a current output value, an accumulated charging time and a charging permission.

10. The method according to claim 7, wherein the method further comprises:
receiving, by the charging pile, exit indicating information sent by the BMS when a battery temperature of the traction battery is greater than a temperature threshold value, and the exit indicating information being used for indicating the charging pile to exit a pulse charging mode, the pulse charging mode being a charging mode using a pulse-type voltage or a pulse-type current.

11. A battery management system of a traction battery, the battery management system comprising:
a processor configured to determine a pulse charging demand parameter according to a battery state parameter of the traction battery;
a transceiver configured to send a pulse charging information to a charging pile, the pulse charging information comprising the pulse charging demand parameter for indicating the charging pile to output a pulse current for charging the traction battery;
wherein the transceiver is further configured to:
send a direct current charging demand parameter to the charging pile, the direct current charging demand parameter comprising at least one of the following parameters: a voltage demand, a current demand, and a charging mode, the charging mode comprising a constant voltage mode or a constant current mode;
send a battery charge state message to the charging pile, the battery charge state message comprising: an estimated remaining charging time, a charging voltage measurement value, a charging current measurement, a current SOC and a group number with its maximum single traction battery voltage.

12. The battery management system according to claim 11, wherein the processor is further configured to:
determine to enter a pulse charging mode according to the battery state parameter, the pulse charging mode being a charging mode using a pulse-type voltage or a pulse-type current.

13. The battery management system according to claim 11, wherein the transceiver is further configured to:
receive a direct current charging output parameter, the direct current charging output parameter comprising at least one of the following parameters: a voltage output value, a current output value, an accumulated charging time and a charging permission.

14. A charging pile for charging a traction battery, the charging pile comprising:
a transceiver configured to receive a pulse charging information sent by a battery management system (BMS) of the traction battery, the pulse charging information comprising a pulse charging demand parameter for indicating the charging pile to output a pulse current for charging the traction battery; and
a processor configured to output the pulse current to the traction battery according to the pulse charging demand parameter;
wherein the transceiver is further configured to:
receive a direct current charging demand parameter, the direct current charging demand parameter comprising at least one of the following parameters: a voltage demand, a current demand, and a charging mode, the charging mode comprising a constant voltage mode or a constant current mode;
receive a battery charge state message, the battery charge state message comprising an estimated remaining charging time and at least one of the following parameters: a charging voltage measurement value, a charging current measurement, a current SOC and a group number with its maximum single traction battery voltage.

15. The charging pile according to claim 14, wherein the transceiver is further configured to:
receive exit indicating information sent by the BMS when a battery temperature of the traction battery is greater than a temperature threshold value, the exit indicating information being used for indicating the charging pile to exit a pulse charging mode, the pulse charging mode being a charging mode using a pulse-type voltage or a pulse-type current.

16. The charging pile according to claim 14, wherein the transceiver is further configured to:
send a direct current charging output parameter, the direct current charging output parameter comprising at least one of the following parameters: a voltage output value, a current output value, an accumulated charging time and a charging permission.

* * * * *